(12) United States Patent
Iwai et al.

(10) Patent No.: US 12,212,509 B2
(45) Date of Patent: *Jan. 28, 2025

(54) TRANSMITTING DEVICE, RECEIVING DEVICE, TRANSMITTING METHOD AND RECEIVING METHOD

(71) Applicant: Panasonic Intellectual Property Corporation of America, Torrance, CA (US)

(72) Inventors: Takashi Iwai, Ishikawa (JP); Hidetoshi Suzuki, Kanagawa (JP); Quan Kuang, Langen (DE); Tomofumi Takata, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,764

(22) Filed: May 3, 2024

(65) Prior Publication Data

US 2024/0291605 A1 Aug. 29, 2024

Related U.S. Application Data

(63) Continuation of application No. 17/429,264, filed as application No. PCT/JP2020/002882 on Jan. 28, 2020, now Pat. No. 12,010,050.

(30) Foreign Application Priority Data

Feb. 14, 2019 (JP) ................................. 2019-024180

(51) Int. Cl.
*H04L 5/00* (2006.01)

(52) U.S. Cl.
CPC ................................. *H04L 5/0039* (2013.01)

(58) Field of Classification Search
CPC ............ H04J 2211/008; H04L 27/0006; H04L 5/0007; H04L 5/001; H04L 5/0037;
(Continued)

(56) References Cited

U.S. PATENT DOCUMENTS 10,868,629 B2 * 12/2020 Kuo ..................... H04J 13/0003
11,419,134 B2 * 8/2022 Park ....................... H04L 5/0044
(Continued)

FOREIGN PATENT DOCUMENTS

CN 111148261 A 5/2020
WO WO 2013139278 A1 9/2013
(Continued)

OTHER PUBLICATIONS

3GPP TR 38.889 V16.0.0, "3rd Generation Partnership Project; Technical Specification Group Radio Access Network; Study on NR-based access to unlicensed spectrum (Release 16)," Dec. 2018, 119 pages.
(Continued)

*Primary Examiner* — Awet Haile
(74) *Attorney, Agent, or Firm* — Seed IP Law Group LLP

(57) ABSTRACT

Provided is a terminal which appropriately transmits and receives signals when operating in an unlicensed band. A terminal (200) is provided with: a mapping unit (207) for allocating a signal to a resource on the basis of control information indicating allocation of groups among a plurality of groups obtained by grouping a plurality of blocks into which a frequency band has been divided, and allocation of resources in the blocks; and a transmitting unit (209) for transmitting the signal.

15 Claims, 18 Drawing Sheets

(58) Field of Classification Search
CPC ............... H04L 5/0044; H04W 16/14; H04W 72/1268; H04W 72/23; H04W 74/0808; H04W 76/15
See application file for complete search history.

(56) References Cited

U.S. PATENT DOCUMENTS

| | | |
|---|---|---|
| 2007/0259672 A1 | 11/2007 | Heo et al. |
| 2011/0085513 A1 | 4/2011 | Chen et al. |
| 2015/0009939 A1* | 1/2015 | Zhang ................... H04L 5/0037 370/329 |
| 2015/0063265 A1 | 3/2015 | Seo et al. |
| 2017/0332378 A1 | 11/2017 | Werner et al. |
| 2018/0049169 A1* | 2/2018 | Lin ...................... H04L 27/2602 |
| 2018/0124790 A1 | 5/2018 | Yerramalli |
| 2020/0119894 A1 | 4/2020 | Jia et al. |
| 2020/0413426 A1 | 12/2020 | Park et al. |
| 2021/0136767 A1* | 5/2021 | Pitaval ................. H04W 74/004 |
| 2021/0176736 A1 | 6/2021 | Harada et al. |
| 2021/0251005 A1* | 8/2021 | Pan ...................... H04L 27/2607 |
| 2021/0314938 A1* | 10/2021 | Kim ....................... H04W 76/10 |

FOREIGN PATENT DOCUMENTS

| | | |
|---|---|---|
| WO | WO 2017126579 A1 | 7/2017 |
| WO | WO 2017164664 A1 | 9/2017 |
| WO | WO 2017195626 A1 | 11/2017 |
| WO | WO 2018224042 A1 | 12/2018 |

OTHER PUBLICATIONS

3GPP TS 36.213 V14.5.0, "3rd Generation Partnership Project; Technical Specification Group Radio Access Network; Evolved Universal Terrestrial Radio Access (E-UTRA); Physical layer procedures (Release 14)," Dec. 2017, 462 pages.

English Translation of Chinese Search Report dated Oct. 31, 2023, for the corresponding Chinese Patent Application No. 202080014433.6, 3 pages.

Extended European Search Report, dated Mar. 25, 2022, for European Application No. 20756032.7-1205, 8 pages.

International Search Report, mailed Apr. 14, 2020, for corresponding International Application No. PCT/JP2020/002882, 4 pages.

OPPO, "Considerations on UL signals and channels for NR-U," R1-1810957, Agenda Item: 7.2.2.3.2, 3GPP TSG RAN WG1 Meeting #94bis, Chengdu, China, Oct. 8-12, 2018, 4 pages.

Panasonic, "Resource allocation for NR-U UL channels," R1-1808619, Agenda Item: 7.2.2.3.2, 3GPP TSG WG1 Meeting #94, Gothenburg, Sweden, Aug. 20-24, 2018, 19 pages.

* cited by examiner

| SCS | M | N |
|---|---|---|
| 15 kHz | 12 | 8 or 9 |
| | 10 | 10 or 11 |
| | 8 | 13 or 14 |
| 30 kHz | 6 | 8 or 9 |
| | 5 | 10 or 11 |
| | 4 | 12 or 13 |
| 60 kHz | 4 | 6 |
| | 3 | 8 |
| | 2 | 12 |
| 60 kHz (if 26 PRBs is supported in a 20 MHz bandwidth) | 4 | 6 or 7 |
| | 2 | 13 |
| | 3 | 8 or 9 |

| RIV | RBstart | L |
|---|---|---|
| 0 | 0 | 1 |
| 1 | 1 | 1 |
| 2 | 2 | 1 |
| 3 | 3 | 1 |
| ... | ... | ... |
| 53 | 3 | 6 |
| 54 | 4 | 6 |
| 55 | | |
| 56 | | |
| 57 | | |
| 58 | | |
| 59 | | |
| 60 | | |
| 61 | | |
| 62 | | |
| 63 | | |

Rows 0–54: Contiguous interlace pattern for M=10, N=10 or 11

Rows 55–63: Remaining RIVs

6bits

| RIV | RBstart | L | M |
|---|---|---|---|
| 0 | 0 | 1 | |
| 1 | 1 | 1 | |
| 2 | 2 | 1 | |
| 3 | 3 | 1 | 10 |
| . | . | . | |
| . | . | . | |
| . | . | . | |
| 53 | 3 | 6 | |
| 54 | 4 | 6 | |
| 55 | 0 | 1 | |
| 56 | 1 | 1 | |
| 57 | 2 | 1 | |
| 58 | 3 | 1 | |
| 59 | 4 | 1 | 12 |
| 60 | 5 | 1 | |
| 61 | 6 | 1 | |
| 62 | 7 | 1 | |
| 63 | no transmission | | |

6bits

Contiguous interlace pattern for M=10, N=10 or 11

Contiguous interlace pattern for M=12, N=9

FIG. 15

| RIV | RBstart | L | M |
|---|---|---|---|
| 0 | 0 | 1 | |
| 1 | 1 | 1 | |
| . | . | . | |
| . | . | . | 10 |
| . | . | . | |
| 32 | 2 | 6 | |
| 33 | 3 | 6 | |
| 34 | 4 | 6 | |
| 35 | 0 | 1 | |
| 36 | 1 | 1 | |
| 37 | 2 | 1 | |
| . | . | . | |
| . | . | . | 12 |
| . | . | . | |
| 45 | 10 | 1 | |
| 46 | 11 | 1 | |
| . | . | . | |
| . | . | . | |
| . | . | . | |
| 62 | | | |
| 63 | | | |

6bits

Contiguous interlace pattern for M=10, N=10 or 11 L = {1, 2, 4, 6, 8, 10}

Contiguous interlace pattern for M=12, N=8 or 9 L = {1}

| RIV | RBstart | L | bandwidth | |
|---|---|---|---|---|
| 0 | 0 | 1 | | Contiguous interlace pattern for M=10, N=10 or 11 |
| 1 | 1 | 1 | | |
| 2 | 2 | 1 | all in cluster group | |
| 3 | 3 | 1 | | |
| . | . | . | | |
| . | . | . | | |
| . | . | . | | |
| 53 | 3 | 6 | | |
| 54 | 4 | 6 | | |
| 55 | 0 | 1 | | Partial assignment within cluster group |
| 56 | 1 | 1 | first half in cluster group | |
| 57 | 2 | 1 | | |
| 58 | 3 | 1 | | |
| 59 | 0 | 1 | | |
| 60 | 1 | 1 | second half in cluster group | |
| 61 | 2 | 1 | | |
| 62 | 3 | 1 | | |
| 63 | | | | |

6bits

FIG. 16

| SCS | M | Allocation method | Signaling bits |
|---|---|---|---|
| 15 | 12 | RIV base | 7 |
| | 10 | | 6 |
| | 8 | | 6 |
| 30 | 6 | Bitmap base | 6 |
| | 5 | | |
| | 4 | | |
| 60 | 4 | Bitmap base | 4 |
| | 3 | | |
| | 2 | | |

| BWP [MHz] | SCS | Number of Cluster group | Allocation method | Signaling bits |
|---|---|---|---|---|
| 20 | 10 | 2 | Bitmap base | 2 |
| 40 | | 4 | | 4 |
| 60 | | 6 | RIV base | 5 |
| 80 | | 8 | | 6 |

FIG. 22

TRANSMITTING DEVICE, RECEIVING DEVICE, TRANSMITTING METHOD AND RECEIVING METHOD

TECHNICAL FIELD

The present disclosure relates to a transmission apparatus, a reception apparatus, a transmission method, and a reception method.

BACKGROUND ART

In the standardization of 5G, 3GPP has been discussing a new radio access technology (NR) that is not necessarily backward compatible with LTE/LTE-Advanced.

Studies have been conducted on operating the NR in unlicensed bands, which requires no license, in addition to licensed bands, which requires a license, as is the case with LTE License-Assisted Access (LAA) (see, for example, Non Patent Literature (hereinafter, referred to as NPL) 1). The operation in unlicensed bands is called, for example, NR-based Access to Unlicensed Spectrum (NR-U).

CITATION LIST

Non-Patent Literature

NPL 1

3GPP TR 38.889 V16.0.0 (2018-12), "Study on NR-based access to unlicensed spectrum (Release 16)"

NPL 2

3GPP TS 36.213 V14.5.0 (2017-12), "E-UTRA Physical layer procedures (Release 14)"

SUMMARY OF INVENTION

However, signal transmission/reception methods in the operation in unlicensed bands have not been comprehensively studied.

One non-limiting and exemplary embodiment facilitates providing a transmission apparatus, a reception apparatus, a transmission method, and a reception method each capable of appropriately transmitting/receiving signals in the operation in unlicensed bands.

A transmission apparatus according to an embodiment of the present disclosure includes: circuitry, which, in operation, assigns a signal to a resource based on control information indicating allocation of a group among a plurality of the groups resulting from grouping a plurality of blocks into which a frequency band is divided, and allocation of the resource in at least one of the plurality of blocks; and a transmitter, which in operation, transmits the signal.

It should be noted that general or specific embodiments may be implemented as a system, a method, an integrated circuit, a computer program, a storage medium, or any selective combination thereof.

According to an embodiment of the present disclosure, it is possible to appropriately transmit/receive signals in the operation in unlicensed bands.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 2 illustrates exemplary relations between the number of interlaces and the number of PRBs per interlace;

FIG. 13 illustrates an exemplary configuration of interlace RA;

FIG. 14 illustrates another exemplary configuration of the interlace RA;

FIG. 15 illustrates still another exemplary configuration of the interlace RA;

FIG. 16 illustrates still another exemplary configuration of the interlace RA;

FIG. 22 illustrates exemplary relations between the number of cluster groups and cluster group allocation methods.

DESCRIPTION OF EMBODIMENTS

Hereinafter, embodiments of the present disclosure will be described in detail with reference to the accompanying drawings.

In unlicensed bands, the upper limit of Power Spectral Density (PSD) is defined by laws, regulations, and standards, for example. The European Telecommunications Standards Institute (ETSI), for example, imposes the upper limit of 10 dBm/MHz (17 dBm/Hz depending on the band), for example, for the PSD in the 5 GHz band on terminals (also referred to as mobile stations or User Equipment (UE)) having a power control function.

In order to transmit signals with higher transmission power under the limitation of the PSD, it is effective to spread resources on frequency domain and map the signals.

In this regard, studies have been carried out on applying a PRB-based block interlace design (also referred to as block-interleaved frequency division multiple access (B-IFDMA)) as a frequency resource allocation method (see, for example, NPL 1).

Figure 1:
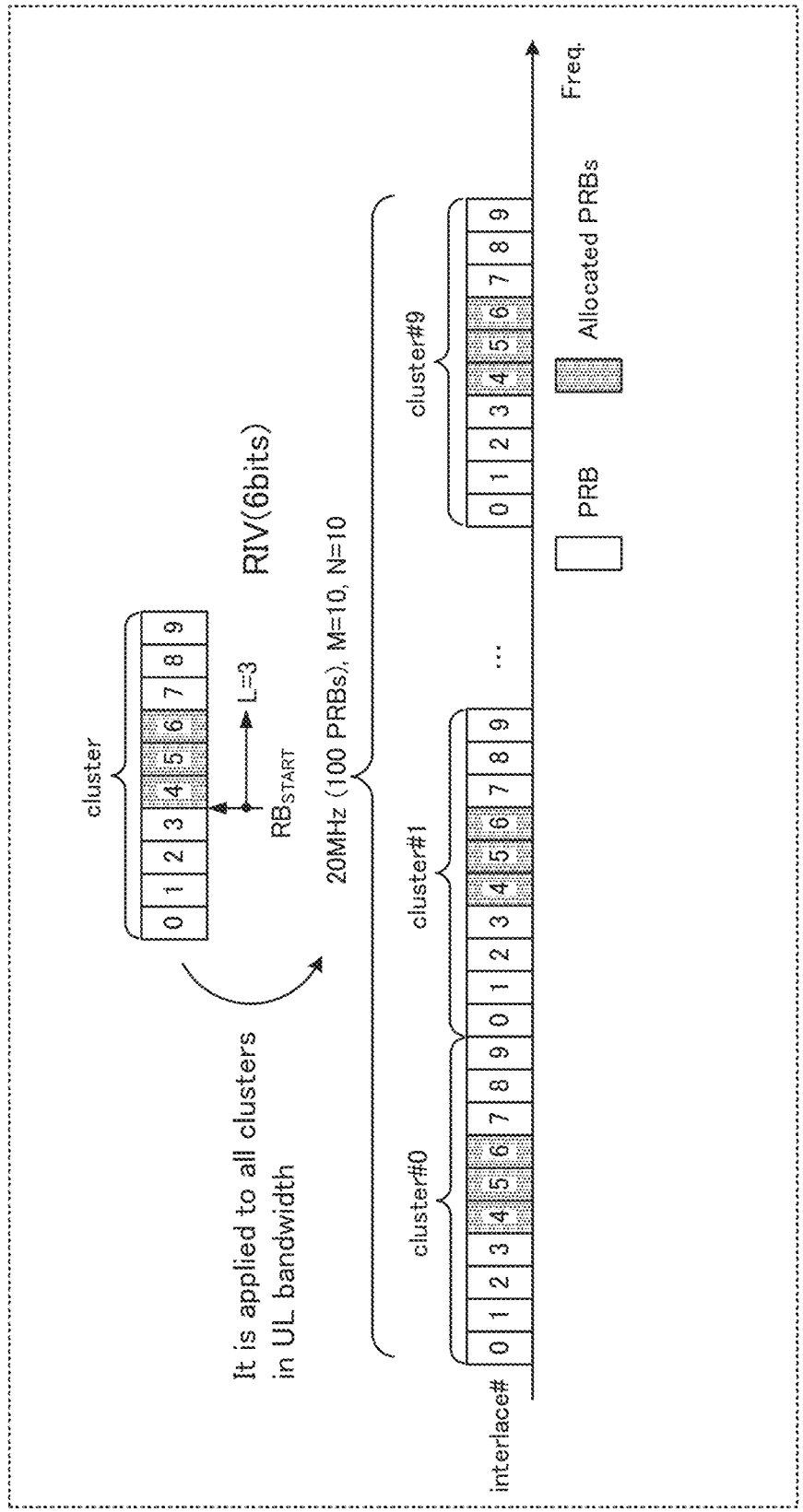
FIG. 1 illustrates an exemplary PRB-based block interlace design.

FIG. 1 illustrates an exemplary PRB-based block interlace design.

The PRB-based block interlace design is used as a frequency resource allocation method for a Physical Uplink Shared Channel (PUSCH), which is an uplink data channel in LTE-LAA. The PRB-based block interlace design is a method of transmitting signals using a band (i.e., resource) called interlaces that are distributed at certain intervals on the frequency domain in a system band, in order to comply with the limitation of an Occupied Channel Bandwidth (OCB) in unlicensed bands defined by the ETSI and to mitigate the effect of the PSD limitation.

The interlace is composed of, for example, a group of contiguous subcarriers (e.g., 1 Physical Resource Block (PRB)). For example, a plurality of interlaces are included in a band (hereinafter, referred to as a cluster or a cluster block) resulting from dividing the system band or a bandwidth part (BWP) of the system band into a plurality of blocks. The interlaces included in each cluster have respective numbers (hereinafter referred to as "interlace numbers").

Note that the cluster means similar to, for example, the "interval" at which the interlaces with the same interlace number are arranged. That is, the interlaces with the same interlace number are evenly distributed on the frequency domain over the plurality of clusters.

For example, the frequency resource allocation method for the PUSCH in LTE-LAA (e.g., also referred to as uplink resource allocation type 3) uses the PRB-based block interlace design where the number of interlaces (hereinafter, represented as "M") is 10 and the number of PRBs per interlace (hereinafter, represented as "N"; i.e., the number of clusters) is 10 PRBs, as illustrated in FIG. 1. In addition, the system bandwidth in LTE-LAA is maximum 20 MHz (100 PRBs), and subcarrier spacing (SCS) is fixed at 15 kHz.

The frequency resource allocation for the PUSCH for the terminal is determined by, for example, a base station (e.g., also referred to as Node B or gNB). The base station indicates the determined frequency resource allocation information (e.g., also referred to as a resource allocation field) to the terminal by including in Downlink Control Information (DCI), for example.

Herein, the frequency resource allocation information is composed of, for example, a resource indication value (RIV) that is control information uniquely associated with a combination of the interlace number of a starting position (e.g., a starting PRB: $RB_{START}$) in the cluster and the contiguous allocation length (i.e., the number of PRBs; e.g., L) from the starting position, as illustrated in FIG. 1. Hereinafter, a method of indicating the frequency resource by the combination of the starting position of the resource and the resource length consecutively used from the starting position is referred to as an "RIV-based allocation method".

LTE-LAA has 55 combinations of $RB_{START}$ and L since M=10. Thus, the frequency resource allocation information (RIV) has an information amount of 6 bits. In addition, the interlace allocation in a cluster indicated by the RIV is applied to all clusters in the system band.

Meanwhile, values indicated in FIG. 2 have been studied in NR-U, for example, in terms of the number of interlaces (M) and the number of PRBs (N) per interlace (see, for example, NPL 1).

For example, studies have been carried out on supporting a plurality of SCSs and supporting different numbers of interlaces (M) for different SCSs in NR-U, as illustrated in FIG. 2.

Figure 3:
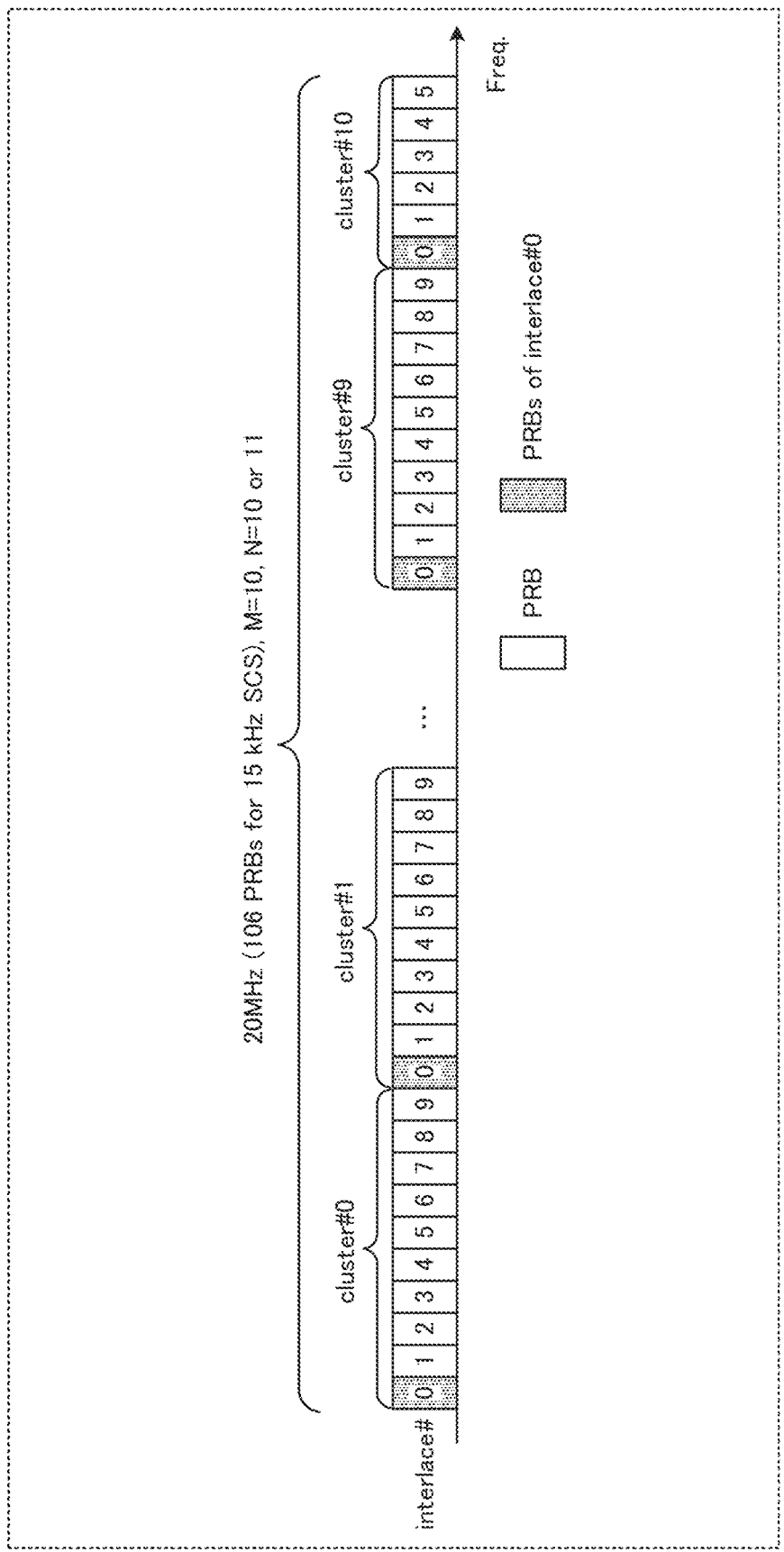
FIG. 3 illustrates another exemplary PRB-based block interlace design.

Studies have also been carried out on supporting a plurality of system bands (BWPs) with different bandwidths in NR-U. FIG. 3 illustrates an exemplary configuration of the system band where 20 MHz=106 PRBs, SCS=15 kHz, M=10, and N=10 or 11. In FIG. 3, the interlace numbers #0, 1, . . . , 9 are assigned to the respective interlaces in the clusters.

As illustrated in FIG. 3, the cluster at the end of the system band (cluster #10 in FIG. 3) sometimes has a bandwidth different from the bandwidths of the other clusters depending on the system bandwidth. For example, the bandwidths of clusters #0 to #9 are 10 PRBs each, whereas the bandwidth of cluster #10 is 6 PRBs (interlaces #0 to #5) in FIG. 3. Thus, N=11 for interlaces #0 to #5, and N=10 for interlaces #6 to #9 in FIG. 3.

Further, studies have been conducted in NR-U on supporting a system bandwidth of 20 MHz or more and indicating the frequency resource allocation for the entire system band by a single DCI.

Thus, the frequency resource allocation method for NR-U needs to take into account the system bandwidth of 20 MHz or more, in contrast to the frequency resource allocation method for LTE-LAA.

In addition, the system bandwidth (or BWP) is different for each terminal in NR-U in some cases. It is thus required to be capable of performing flexible frequency multiplexing among the terminals configured with different system bandwidths.

Further, since NR-U supports a plurality of SCSs, it is required to discuss the frequency resource allocation method suitable for each SCS. It is also required to discuss a case of using the RIV-based frequency resource allocation method.

Thus, descriptions will be given below of transmission and reception methods for uplink signals in NR-U.

[Overview of Communication System]

The communication system according to an embodiment of the present disclosure includes base station 100 and terminal 200. In the following description, base station 100 (corresponding to a reception apparatus) determines a frequency resource to be allocated to terminal 200, and indicates information indicating the determined resource, by way of example. Then, terminal 200 (corresponding to a transmission apparatus) performs signal transmission processing including mapping to the resource based on the indicated information, and transmits the signal to base station 100.

Figure 4:
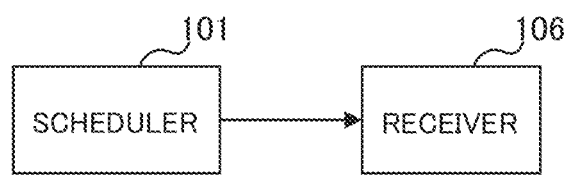
FIG. 4 is a block diagram illustrating a configuration of part of a base station.

FIG. 4 is a block diagram illustrating an example of a configuration of a part of base station 100 according to an embodiment of the present disclosure. In base station 100 illustrated in FIG. 4, scheduler 101 determines allocation (e.g., cluster RA) of groups among a plurality of groups (e.g., cluster groups) resulting from grouping a plurality of blocks (e.g., clusters) into which the frequency band is divided, and allocation (e.g., interlace RA) of resources (e.g., interlaces) in the blocks. Receiver 106 receives signals based on the allocation of the groups and the allocation of the resources.

Figure 5:
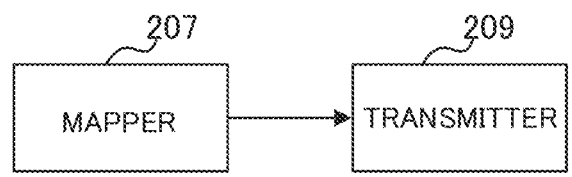
FIG. 5 is a block diagram illustrating a configuration of part of a terminal.

FIG. 5 is a block diagram illustrating an example of a configuration of a part of terminal 200 according to an embodiment of the present disclosure. In terminal 200 illustrated in FIG. 5, mapper 207 assigns signals to the resources based on control information indicating the allocation (e.g., cluster RA) of the groups among the plurality of groups (e.g., cluster groups) resulting from grouping the plurality of blocks (e.g., clusters) into which the frequency band is divided, and the allocation (e.g., interlace RA) of the resources (e.g., interlaces) in the blocks. Transmitter 209 transmits the signals.

[Configuration of Base Station]

Figure 6:
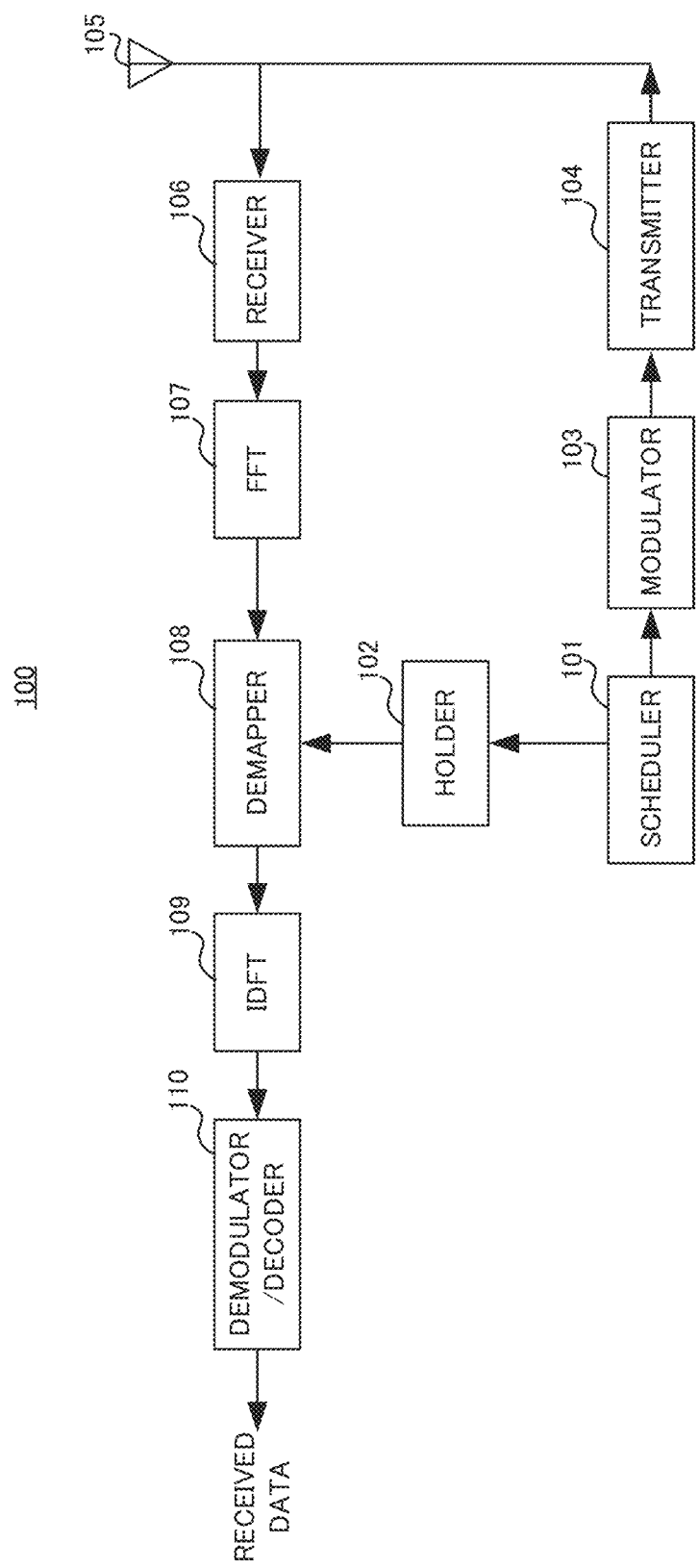
FIG. 6 is a block diagram illustrating the configuration of the base station.

FIG. 6 is a block diagram illustrating the configuration of base station 100 according to the present embodiment.

In FIG. 6, base station 100 includes scheduler 101, holder 102, modulator 103, transmitter 104, antenna 105, receiver 106, Fast Fourier Transformer (FFT) 107, demapper 108, Inverse Discrete Fourier Transformer (IDFT) 109, and demodulator/decoder 110.

Scheduler 101 determines radio resource allocation (e.g., frequency resource allocation, time resource allocation, or transmit power control information) for an uplink data channel (PUSCH) for terminal 200 connected to base station 100. Scheduler 101 outputs the determined radio resource allocation information to holder 102 and modulator 103.

Herein, the frequency resource allocation is determined by, for example, frequency resource allocation for the interlaces in a cluster (hereinafter, referred to as interlace resource allocation (interlace RA)) and frequency resource allocation for the cluster groups (hereinafter, referred to as cluster resource allocation (cluster RA)), in accordance with rules to be described later. In other words, the frequency resource allocation information indicated to terminal 200 is composed of 2 types of frequency resource allocation information, which are the interlace RA information and the cluster RA information.

Note that the "cluster group" means a band including one or a plurality of contiguous clusters on the frequency domain, for example.

The bandwidth or SCS of the BWP of terminal 200 may be indicated in advance from base station 100 to terminal 200 by, for example, higher layer signaling (also referred to as Radio Resource Control signaling (RRC signaling)). Additionally, part of the information of the frequency resource allocation may be transmitted by the higher layer signaling.

For example, the interlace RA information may be transmitted by the DCI, and the cluster RA information may be transmitted by the higher layer signaling. This allows scheduler 101 to dynamically control the interlace allocation in the cluster according to communication quality, for example. Meanwhile, an average variation of the communication quality among cluster groups is relatively small, and thus, while static control using the higher layer signaling for the cluster RA gives little effect on the performance, the signaling overhead can be reduced.

Holder 102 holds the frequency resource allocation information (including, for example, the interlace RA information and the cluster RA information) inputted from scheduler 101 in order to receive a signal transmitted from terminal 200 for which the frequency resource has been allocated, and outputs the information to demapper 108 in receiving the signal of the intended terminal 200.

Modulator 103 generates the DCI based on the radio resource allocation information inputted from scheduler 101, modulates the generated DCI, and outputs the DCI to transmitter 104.

Transmitter 104 performs transmission processing such as D/A conversion, up-conversion, and amplification on the signal inputted from modulator 103, and transmits the signal after the transmission processing from antenna 105.

Receiver 106 receives a signal transmitted from terminal 200 via antenna 105, performs reception processing such as down-conversion and A/D conversion on the received signal, and outputs the received signal after the reception processing to FFT 107.

FFT 107 removes a Cyclic Prefix (CP) portion from the received signal inputted from receiver 106, converts the signal into a signal on the frequency domain by FFT processing, and outputs the signal on the frequency domain to demapper 108.

Demapper 108 extracts a signal corresponding to the frequency resource allocated to the intended terminal 200 from the signal on the frequency domain inputted from FFT 107, based on the interlace RA information and the cluster RA information for the intended terminal 200 inputted from holder 102. Demapper 108 outputs the extracted signal to IDFT 109.

IDFT 109 performs IDFT processing on the signal inputted from demapper 108, and outputs the signal to demodulator/decoder 110. Note that IDFT 109 (IDFT processing) is required when terminal 200 transmits a Discrete Fourier Transform-spread Orthogonal Frequency Division Multiplexing (DFT-S-OFDM) signal. IDFT 109 (IDFT processing) is not required when terminal 200 transmits an OFDM signal. The transmission method (DFT-S-OFDM or OFDM) of terminal 200 may be determined in advance by base station 100 based on a communication state (e.g., powerhead room of transmission power) of terminal 200, and indicated to terminal 200 by the higher layer signaling, for example.

Demodulator/decoder 110 performs demodulation processing and decoding processing on the signal inputted from IDFT 109, and outputs the received data.

[Configuration of Terminal]

Figure 7:
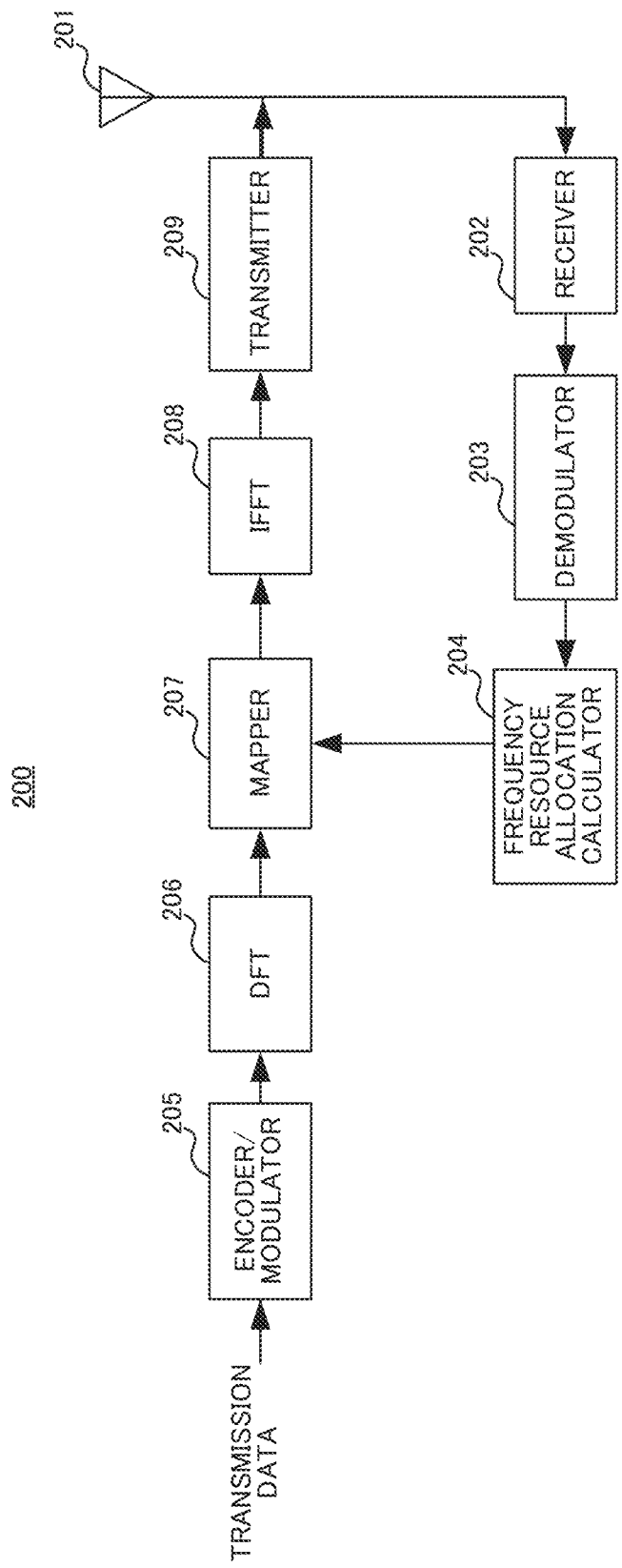
FIG. 7 is a block diagram illustrating the configuration of the terminal.

FIG. 7 is a block diagram illustrating the configuration of terminal 200 according to the present embodiment.

In FIG. 7, terminal 200 includes antenna 201, receiver 202, demodulator 203, frequency resource allocation calculator 204, encoder/modulator 205, DFT 206, mapper 207, IFFT 208, and transmitter 209.

Receiver 202 receives a signal transmitted from base station 100 via antenna 201, performs reception processing such as down-conversion and A/D conversion on the received signal, and outputs the received signal after the reception processing to demodulator 203. Demodulator 203 demodulates the received signal inputted from receiver 202, and outputs the demodulated DCI to frequency resource allocation calculator 204.

Frequency resource allocation calculator 204 calculates the frequency resource allocation information (e.g., the interlace RA information and the cluster RA information) based on the DCI inputted from demodulator 203, and outputs the information to mapper 207.

Encoder/modulator 205 encodes and modulates transmission data (i.e., uplink data), and outputs the modulated data signal to DFT 206.

DFT 206 performs DFT processing on the data signal inputted from encoder/modulator 205, and outputs the signal after the DFT processing to mapper 207. Note that DFT 206 (DFT processing) is required when terminal 200 transmits a DFT-S-OFDM signal. DFT 206 (DFT processing) is not required when terminal 200 transmits an OFDM signal.

Mapper 207 maps (i.e., assigns) the data signal inputted from DFT 206 to the frequency resource based on the frequency resource allocation information inputted from frequency resource allocation calculator 204. For example, mapper 207 maps the data signal to the frequency resource with an indicated interlace number in clusters included in an indicated cluster group. Mapper 207 outputs the mapped data signal to IFFT 208.

IFFT 208 performs IFFT processing on the signal inputted from mapper 207, and outputs the signal with the CP added to transmitter 209.

Transmitter 209 performs transmission processing such as D/A conversion, up-conversion, and amplification on the signal inputted from IFFT 208, and transmits the signal after the transmission processing from antenna 201.

[Exemplary Operations in Base Station 100 and Terminal 200]

Exemplary operations in base station 100 and terminal 200 including the above-described configurations will be described.

Figure 8:
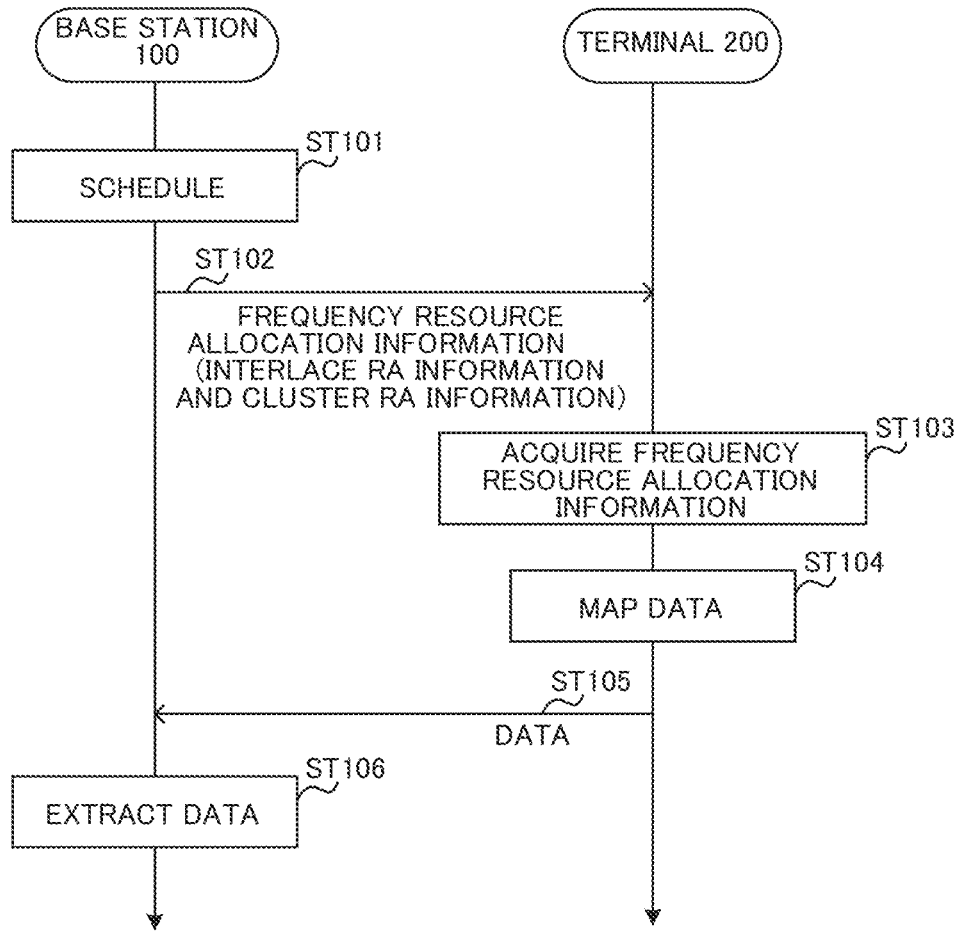
FIG. 8 is a sequence diagram describing exemplary operations in the base station and the terminal.

FIG. 8 is a sequence diagram describing the exemplary operations in base station 100 (FIG. 6) and terminal 200 (FIG. 7).

In FIG. 8, base station 100 performs scheduling for terminal 200 (ST101).

Base station 100 transmits, for example, the radio resource allocation information indicating the scheduling result for terminal 200 to terminal 200 (ST102). The radio resource allocation information includes the frequency resource allocation information including, for example, the interlace RA information and the cluster RA information. Note that each of the interlace RA information and the cluster RA information may be indicated from base station 100 to terminal 200 by the higher layer signaling or the DCI, as described above. Terminal 200 acquires the frequency resource allocation information indicated from base station 100 (ST103).

Terminal 200 maps data (e.g., a PUSCH signal) to the resource based on the acquired frequency resource allocation information (ST104). Terminal 200 transmits the data mapped to the resource to base station 100 (ST105).

Base station 100 extracts the data transmitted from terminal 200 based on the frequency resource allocated to terminal 200 (ST106).

[Frequency Resource Allocation Method]

Next, an exemplary frequency resource allocation method in scheduler 101 will be described.

Figure 9:
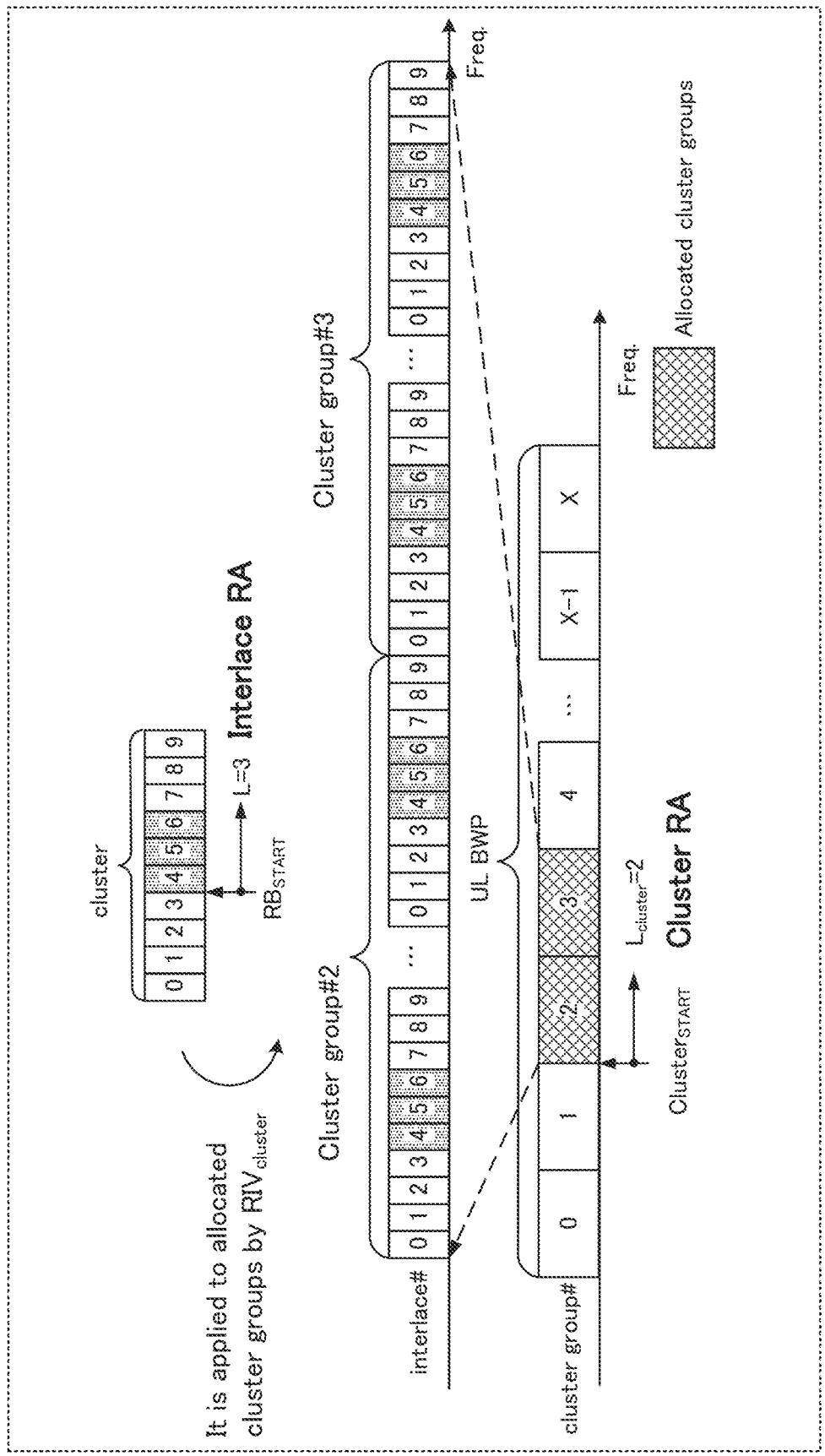
FIG. 9 illustrates exemplary frequency resource allocation.

FIG. 9 illustrates an exemplary frequency resource allocation applying the PRB-based block interlace design according to the present embodiment.

The frequency resource allocation according to the present embodiment is performed by combining the frequency resource allocation for interlaces in clusters (interlace RA) and the frequency resource allocation for cluster groups in a system band or a BWP (cluster RA).

Herein, the "cluster group" means a band including one or contiguous clusters on the frequency domain. In other words, the cluster group is configured by grouping a plurality of clusters resulting from dividing the frequency band such as the system band or the BWP.

In addition, the "interlace RA" indicates a resource of the allocated interlaces in the clusters. In other words, the interlace RA indicates the interlace resource allocation in the clusters for terminal 200.

Further, the "cluster RA" indicates a resource of the allocated cluster groups in the BWP (or system band). In other words, the cluster RA indicates the cluster group allocation among the plurality of cluster groups for terminal 200.

Note that FIG. 9 illustrates the interlace RA and the cluster RA both applying the RIV-based allocation (combination of the starting resource position and the resource length consecutively used), by way of example, but the allocation method is not limited to this. For example, the interlace RA or the cluster RA may apply a method of indicating information of whether to allocate for each resource unit (PRB unit or cluster group unit), i.e., information of whether each interlace in the clusters is allocated. Hereinafter, the method is referred to as bitmap-based allocation.

In FIG. 9, for example, the cluster RA is configured with Cluster$_{START}$=2 and L$_{cluster}$=2 for terminal 200. Terminal 200 then determines that two cluster groups of cluster groups #2 and #3 among cluster groups #0 to #X in the BWP (e.g., also referred to as UL BWP) are allocated.

In addition, the interlace RA is configured with RB$_{START}$=4 and L=3 for terminal 200 in FIG. 9, for example. Terminal 200 then determines that three interlaces of interlaces #4 to #6 are allocated.

Thus, terminal 200 determines that interlaces #4 to #6 in cluster groups #2 and #3 are allocated in FIG. 9.

In the present embodiment, the cluster RA is indicated in addition to the interlace RA, as described above. This enables allocation of different cluster groups (i.e., different clusters) for different terminals 200 even when the different system bandwidths (or BWPs) are configured to those terminals 200, for example. Thus, according to the present embodiment, it is possible to flexibly perform frequency multiplexing among terminals 200 configured with different system bandwidths or BWPs, for example.

[Exemplary Cluster Group Configuration]

Next, exemplary configurations of the cluster groups will be described.

<Cluster Group Configuration Example 1>

Figure 10:
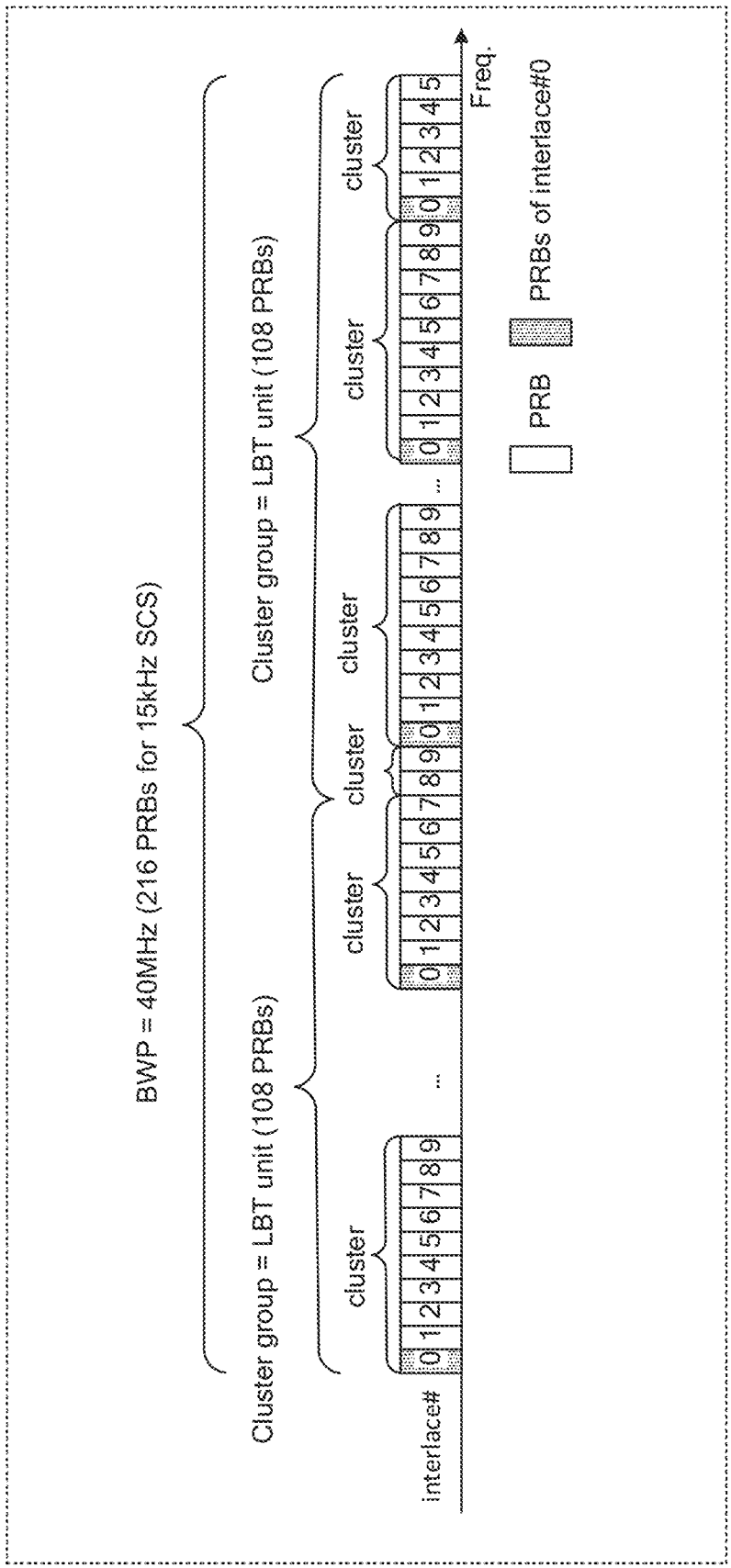
FIG. 10 illustrates an exemplary configuration of cluster groups.

The cluster groups are configured on Listen Before Talk (LBT) subbands (also referred to as LBT units), for example, as illustrated in FIG. 10. The LBT subband is a band where terminal 200 and base station 100 perform carrier sensing. The bandwidth of the LBT subband (including a guard band) is 20 MHz, for example.

In the example illustrated in FIG. 10, the BWP is 40 MHZ (216 PRBs) and the cluster group is configured for each LBT subband (108 PRBs). For example, the BWP, which is 40 MHz (216 PRBs), is divided into the cluster groups of 108 PRBs each in FIG. 10.

This allows base station 100 to control the frequency resource allocation in cluster group units according to an interference state of terminal 200 in each LBT subband. Thus, base station 100 can appropriately perform frequency scheduling for terminal 200 even in the system bandwidth (or BWP) of 20 MHz or more, for example.

Note that, as illustrated in FIG. 10, the bandwidths of the clusters at both ends of the cluster groups (8 PRBs, 2 PRBs, or 6 PRBs in FIG. 10) may be different from the bandwidths of the other clusters (10 PRBs in FIG. 10).

<Cluster Group Configuration Example 2>

Figure 11:
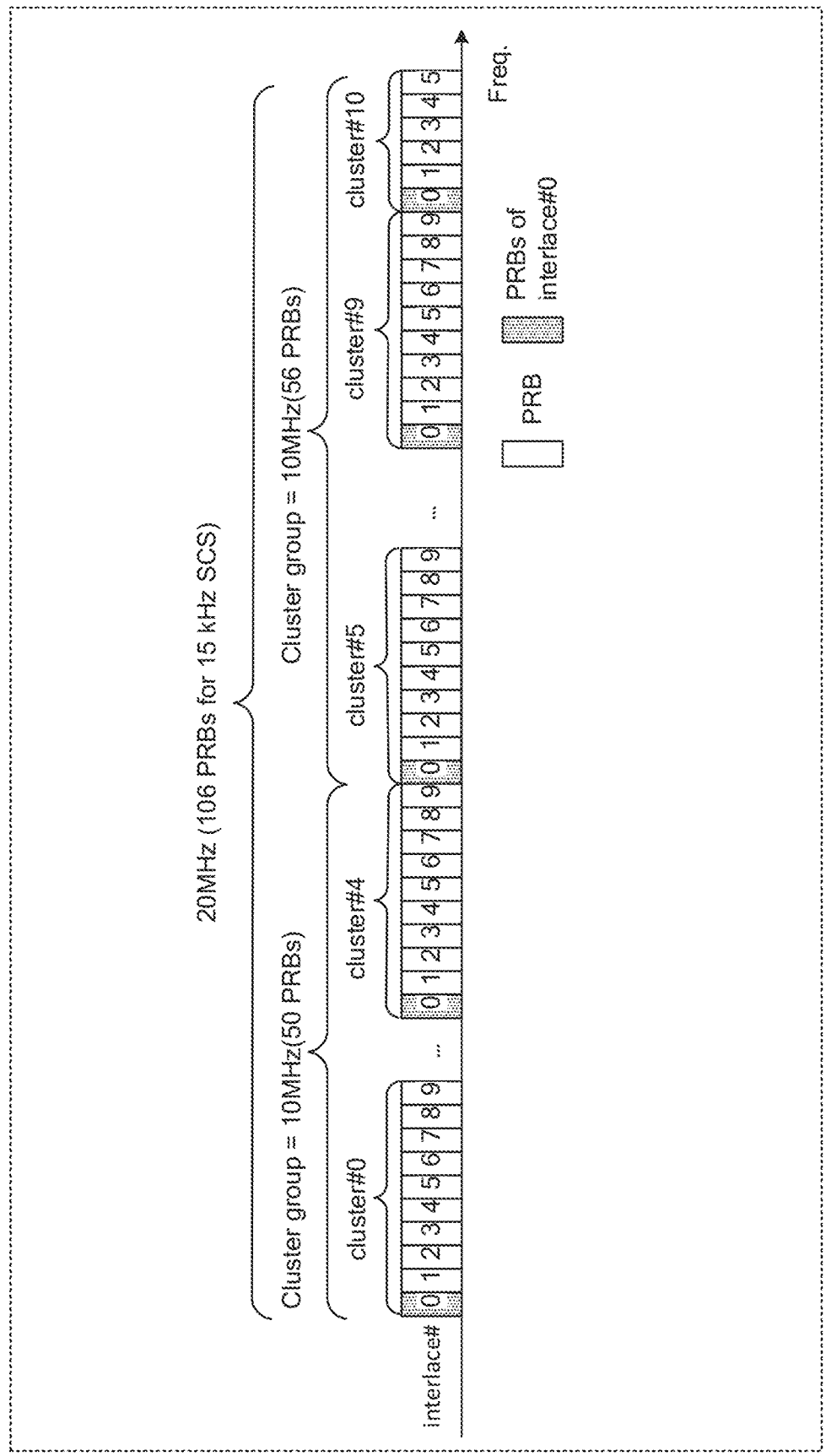
FIG. 11 illustrates another exemplary configuration of the cluster groups.

As illustrated in FIG. 11, the cluster groups may be configured by dividing the LBT subband (e.g., 20 MHz, 106 PRBs) in units of clusters such that the cluster groups have substantially the same number of clusters, for example.

In the example illustrated in FIG. 11, the BWP is 20 MHz (106 PRBs) and divided into two cluster groups. The cluster group on the first half (i.e., lower frequency side) illustrated in FIG. 11 is composed of 50 PRBs of five clusters #0 to #4. The cluster group on the second half (i.e., higher frequency side) is composed of 56 PRBs of six clusters #5 to #10.

This allows base station 100 to increase the number of terminals 200 to be frequency-multiplexed in the LBT subband.

<Cluster Group Configuration Example 3>

Figure 12:
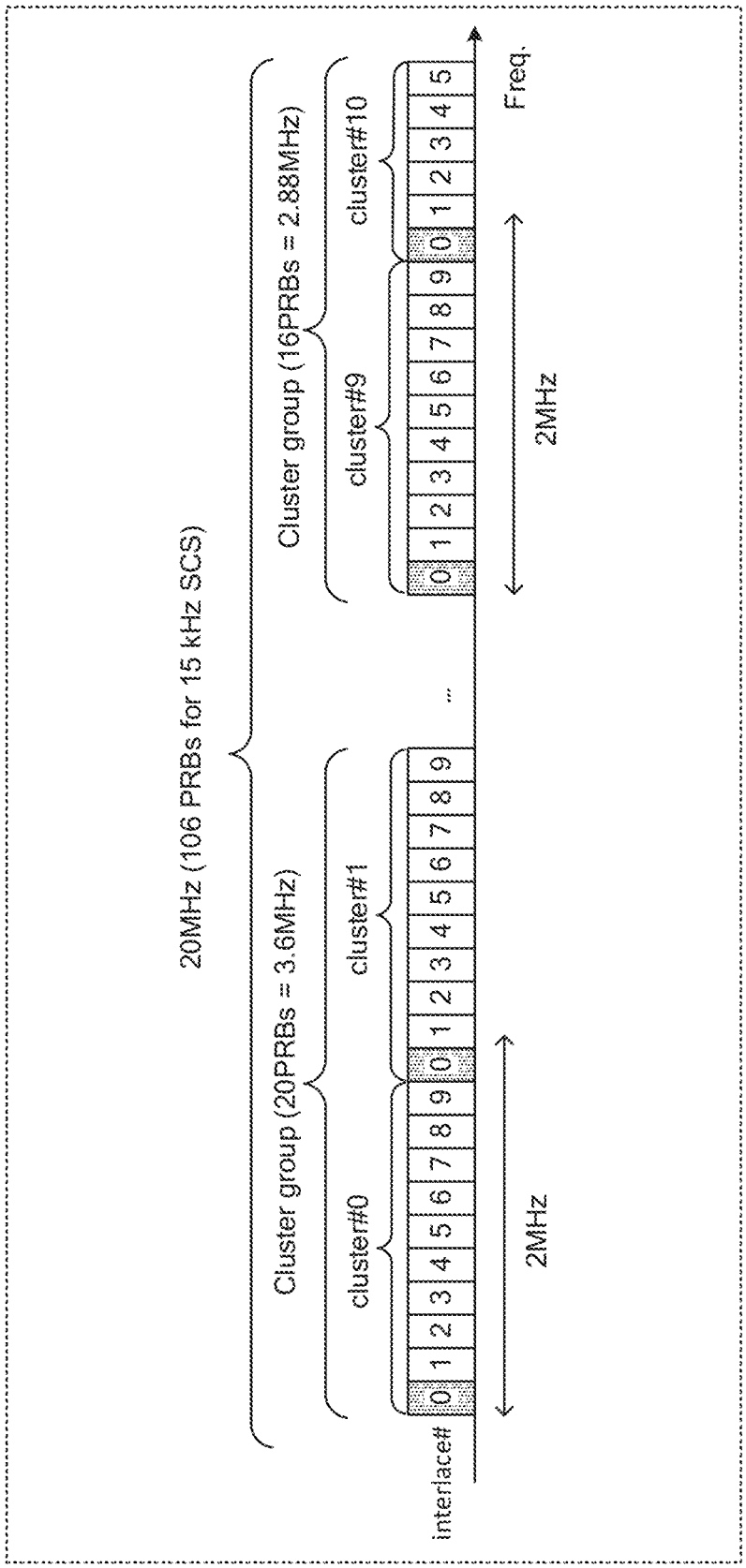
FIG. 12 illustrates still another exemplary configuration of the cluster groups.

The cluster group is composed of the minimum number of clusters having a bandwidth equal to or wider than the specified minimum bandwidth, and the minimum number of clusters makes a bandwidth of the cluster group. For example, as illustrated in FIG. 12, each cluster group is composed of two clusters that is a minimum number having a bandwidth of 2 MHz or more.

2 MHz indicates the minimum bandwidth in a regulation of a temporarily operation in the OCB specification defined by the ETSI. The regulation states that, as long as some signals satisfy the OCB specification of 80-100%, other signals only need to be 2 MHz or more in the same COT. In the example illustrated in FIG. 12, each cluster group is thus composed of two clusters with the minimum bandwidth of 2 MHz or more. Note that the minimum bandwidth is not limited to 2 MHZ, and may be another bandwidth.

This allows base station 100 to perform the frequency scheduling for each terminal with finer granularity while satisfying the OCB specification.

The exemplary configurations of the cluster groups have been described, thus far.

Here comes to a discussion on a case of indicating the interlace RA for each cluster group (e.g., for each LBT subband) instead of the cluster RA. When the BWP is 80 MHZ, for example, four interlace RAs for respective LBT subbands (20 MHz each) are indicated to terminal 200. For the number of signaling bits of each interlace RA, the number of contiguous interlace allocation patterns is determined according to the number of interlaces (M). When M=10, for example, the interlace RA includes 6 signaling bits. Thus, the total number of signaling bits of the four interlace RAs is determined to be 24 bits by multiplying 6 by 4 in this case.

In the present embodiment, in contrast, the cluster RA includes 4 signaling bits when, for example, the BWP is 80 MHz and the cluster RA for each LBT subband (20 MHz) is indicated on the RIV or bitmap basis. When M=10, for example, the interlace RA includes 6 signaling bits. Thus, when the BWP is 80 MHz, the total number of signaling bits of the interlace RA and the cluster RA is determined to be 10 bits by adding 6 to 4.

The present embodiment thus enables reducing overhead compared with the case of indicating the interlace RA for each cluster group. This allows base station 100 to appropriately perform the frequency scheduling for terminal 200 while reducing the signaling overhead even in the system bandwidth (or BWP) of 20 MHz or more, for example.

Additionally, when each cluster RA has the same bandwidth, the number of terminals that can be frequency-multiplexed in the same slot is the same as in the above-described method of transmitting a plurality of interlace RAs. Further, signals can still be distributed throughout the cluster group length in the method illustrated in FIG. 10, thereby achieving the frequency diversity gain equivalent to that in the above-described method of transmitting a plurality of interlace RAs. Although the interlace allocation (allocation of interlace #0 in FIG. 10) is the same among the cluster groups in the method illustrated in FIG. 10, flexibility of scheduling can be improved by, for example, adjusting the bandwidths of the cluster groups according to the number of terminals 200 in a cell. When there is a large number of terminals 200, for example, the flexibility of scheduling can be improved by configuring narrower bandwidths for the cluster groups (configuring finer allocation granularity for the clusters), and by frequency-multiplexing a plurality of terminals among the cluster groups.

[Exemplary Configuration of Interlace RA]

Next, exemplary configurations of the interlace RA will be described.

Hereinafter, the RIV-based allocation method is applied to the interlace RA, by way of example.

FIG. 13 illustrates exemplary RIVs. The RIV indicates, for example, the combination of the allocation starting position (e.g., PRB number "RBstart") of the interlace resources in a single cluster and the number of resources (length) L consecutively allocated from the allocation starting position. FIG. 13 illustrates exemplary RIV patterns (i.e., interlace allocation patterns indicated by the allocation starting position and the number of resources) in a case where the number of interlaces (M) is 10. The RIV indicated from base station 100 to terminal 200 indicates any of the interlace allocation patterns illustrated in FIG. 13.

The allocation patterns of contiguous interlaces on the frequency domain depend on the number of interlaces. In the example of FIG. 13, the allocation patterns of contiguous interlaces indicated by the RIV includes $_{11}C_2=55$ patterns, which is information of at least 6 bits.

Herein, application of the RIV-based allocation method makes it possible to add allocation patterns different from the allocation patterns of the contiguous interlaces (e.g., allocation patterns of non-contiguous interlaces) while preventing the increase in the number of signaling bits. In FIG. 13, for example, the number of signaling bits does not increase even in a case of adding 9 patterns corresponding to the remaining RIVs, which is from 55 to 63, to the RIVs from 0 to 54 corresponding to the contiguous interlace patterns.

Exemplary configurations of the RIV-based interlace RA will be described below.

<Interlace RA Configuration Example 1>

In Configuration Example 1, as illustrated in FIG. 14, the allocation patterns (e.g., RIVs=0 to 54) of the contiguous interlaces are configured for the first number of interlaces (e.g., M=10), and other allocation patterns of interlaces are also configured (i.e., added) for the second number of interlaces (e.g., M=12) that is different from the first number of interlaces, for example.

FIG. 14 includes additional allocation patterns of interlaces for the RIVs 55 to 62, for example. The allocation patterns are for interlaces with the contiguous allocation length of 1 PRB (i.e., L=1) in a cluster where M=12.

In Configuration Example 1, the interlace RA information includes the interlace allocation patterns for different numbers of interlaces in a cluster (M=10 and M=12, in FIG. 14) as described above. This allows base station 100 to dynamically change the minimum allocation bandwidth for a single terminal 200 using the DCI while preventing the increase in the signaling overhead.

When M=10, for example, the minimum allocation bandwidth (corresponding to N) is 10 PRBs. Meanwhile, the minimum allocation bandwidth (corresponding to N) is 9 PRBs for the interlace allocation patterns to satisfy the OCB specification when M=12 and the contiguous allocation length is 1 PRB in the cluster.

When the minimum allocation bandwidth is narrowed, it is possible to allocate a resource with a narrow bandwidth to a cell-edge terminal that requires transmission power to compensate for path loss, for example, thus reducing performance deterioration of the terminal due to a transmission power shortage. Incidentally, the PRB-based block interlace design focuses on the frequency diversity gain. In this regard, the interlace allocation with the contiguous allocation length (L) limited to 1 PRB still causes signals to be distributed throughout the band corresponding to the cluster group, thereby obtaining sufficient frequency diversity gain.

Note that the RIVs need not include the interlace allocation patterns for all the allocation lengths (L). As illustrated in FIG. 15, the interlace allocation patterns for some allocation lengths (L) may be excluded in the interlace where M=10, for example. In FIG. 15, the allocation lengths L={3, 5, 7, 9} are excluded, and it is limited to the allocation lengths L={1, 2, 4, 6, 8, 10} in the interlace where M=10, by way of example.

As illustrated in FIG. 15, evenly thinning some of the indicatable allocation lengths L prevents flexibility in scheduling allocation from greatly deteriorating. Further, more of other patterns for the different number of interlaces (M) can be added to replace the excluded patterns, thereby improving scheduling gain. For example, it is possible to add all the allocation patterns for the case where M=12 and L=1 (i.e., patterns for the case where RBstart=0 to 11) in FIG. 15. The addition of the patterns for the case where M=12 and interlace allocation length L=1 increases the number of terminals that can be frequency-multiplexed, and narrows the minimum bandwidth per terminal. In addition, the patterns for the case where L=1 still causes signals to be distributed throughout the band corresponding to the cluster group, thus obtaining sufficient frequency diversity gain.

<Interlace RA Configuration Example 2>

In Configuration Example 2, as illustrated in FIG. 14, an allocation pattern of no uplink data transmission (No transmission) is added to the contiguous interlace patterns for the first number of interlaces (e.g., M=10), for example.

This allows base station 100 to indicate the no uplink data transmission to intended terminal 200 using the DCI while preventing the increase in the signaling overhead.

For example, when an uplink data band is allocated to another terminal 200 and it is required to indicate a single transmission of an SRS (Sounding Reference Signal), base station 100 can indicate the No transmission by the RIV (e.g., RIV=63 in FIG. 14), and this indicates the single transmission of the SRS.

Alternatively, when a plurality of interlace RAs are indicated for each cluster group (e.g., for each LBT subband) as described above, base station 100 can independently indicate the No transmission in each interlace RA, thereby controlling the frequency resource to be allocated to terminal 200 in units of the cluster groups.

<Interlace RA Configuration Example 3>

In Configuration Example 3, as illustrated in FIG. 16, partial allocation patterns in the cluster group (i.e., allocation patterns for part of the group) are added to the contiguous interlace patterns for a certain number of interlaces (e.g., M=10), for example.

For example, RIVs 0 to 54 configure the interlace allocation patterns for all clusters in the cluster group allocated by the cluster RA, in FIG. 16.

In addition, RIVs 55 to 58 configure the interlace allocation patterns for the first half of the clusters (e.g., clusters on a lower frequency side) in the cluster group allocated by the cluster RA, in FIG. 16. In other words, the second half of the clusters in the cluster group allocated by the cluster RA are not allocated to terminal 200 by the RIVs 55 to 58 illustrated in FIG. 16.

Likewise, RIVs 59 to 62 configure the interlace allocation patterns for the second half of the clusters (e.g., clusters on a higher frequency side) in the cluster group allocated by the cluster RA, in FIG. 16. In other words, the first half of the clusters in the cluster group allocated by the cluster RA are not allocated to terminal 200 by the RIVs 59 to 62 illustrated in FIG. 16.

This allows base station 100 to dynamically control (i.e., schedule) the partial interlace allocation in the cluster group allocated to terminal 200 (e.g., the cluster group allocated by the cluster RA), for example. It is also possible to narrow the minimum bandwidth for terminal 200 while preventing the increase in the signaling overhead.

<Interlace RA Configuration Example 4>

Configuration Example 4 focuses on a relation between the number of interlaces (M) and the number of signaling bits in the RIV-based allocation method and the bitmap-based allocation method.

Figures 17, 18:
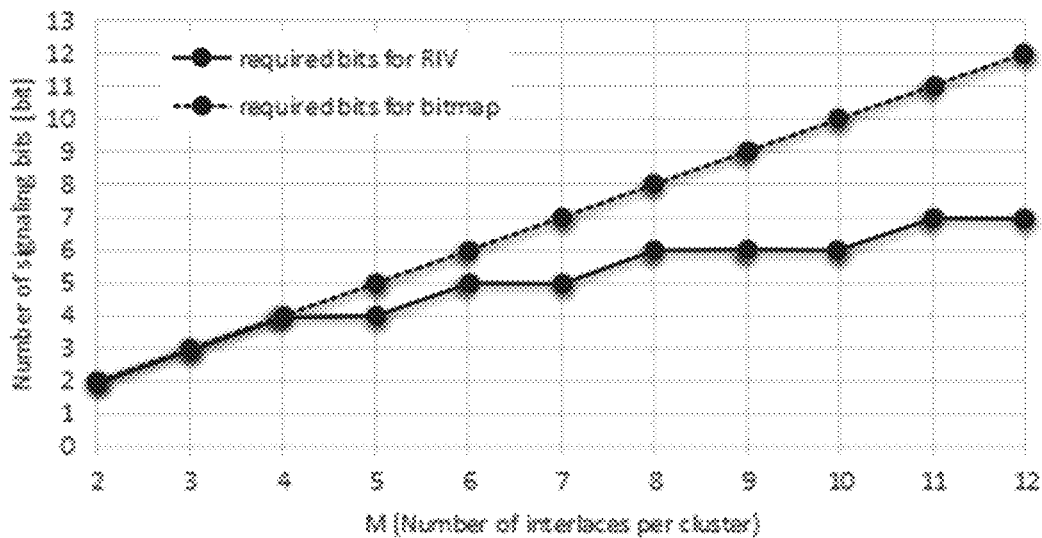
FIG. 17 illustrates exemplary relations between the number of interlaces and the number of signaling bits.
FIG. 18 illustrates exemplary relations between subcarrier spacing and interlace allocation methods.

FIG. 17 illustrates exemplary relations between the number of interlaces (M) and the number of signaling bits in the RIV-based allocation method and the bitmap-based allocation method. The horizontal axis indicates the number of interlaces (M) and the vertical axis indicates the number of signaling bits in FIG. 17.

As illustrated in FIG. 17, there is a small difference in the number of signaling bits between the RIV-based allocation method and the bitmap-based allocation method when M is small. For example, there is no difference in the number of signaling bits between the RIV-based allocation method and the bitmap-based allocation method when M is 4 or less. When M is 5 or 6, there is a difference of 1 bit between the RIV-based allocation method and the bitmap-based allocation method.

Incidentally, studies have been conducted in NR-U on supporting, for example, the number of interlaces M of 6 or less when SCS=30 kHz and 60 kHz, as illustrated in FIG. 2.

In this regard, Configuration Example 4 applies, as illustrated in FIG. 18, the RIV-based allocation method to the interlace RA when the SCS is equal to or less than a threshold (e.g., 15 kHz), and applies the bitmap-based allocation method to the interlace RA when the SCS is greater than the threshold (e.g., 15 kHz), for example.

Thus, the RIV-based allocation method is applied, for example, for the SCS (e.g., 15 kHz) that has a narrow bandwidth per 1 PRB and applies a relatively large number of interlaces (M). This reduces the signaling overhead.

In contrast, the bitmap-based allocation method is applied for the SCS (e.g., 30 kHz or 60 kHz) that has a large bandwidth per 1 PRB and applies a relatively small number of interlaces (M). This enables the allocation including non-contiguous interlace allocation patterns by the bitmap while preventing the increase in the signaling overhead, thereby improving the scheduling gain.

As described above, Configuration Example 4 makes it possible to apply the frequency resource allocation method suitable for the SCS.

<Interlace RA Configuration Example 5>

In Configuration Example 5, the allocation pattern of contiguous virtual interlaces is indicated as the interlace RA information. In other words, the interlace RA information indicates contiguous virtual interlace numbers.

For example, base station 100 indicates a contiguous interlace allocation pattern to terminal 200 using virtual interlace numbers (PRB numbers). Terminal 200 converts the indicated virtual interlace numbers (PRB numbers) into actual interlace numbers (PRB numbers) according to a rule determined between base station 100 and terminal 200. Terminal 200 assigns signals to the interlaces with the actual interlace numbers that have been converted.

Figure 19:
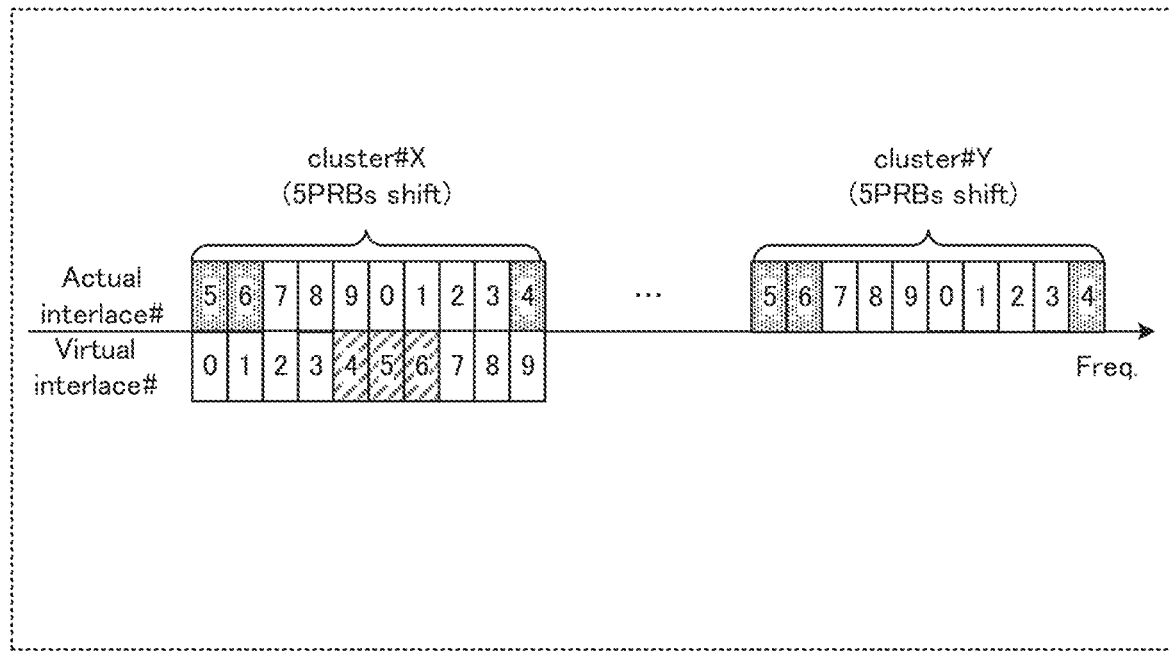
FIG. 19 illustrates exemplary interlace allocation using virtual interlace numbers.

In the example illustrated in FIG. 19, virtual interlace numbers #0 to #9 are respectively assigned to the interlaces (i.e., PRBs) in the cluster, for example. In the example illustrated in FIG. 19, the actual interlace numbers are numbers obtained by cyclically shifting virtual interlace numbers #0 to #9 by 5 PRBs in each cluster. In other words, the rule for converting the virtual interlace numbers to the actual interlace numbers is the same among a plurality of clusters in FIG. 19.

In FIG. 19, base station 100 indicates the contiguous interlace allocation pattern of virtual interlace numbers #4 to #6 to terminal 200 by the RIV-based allocation method.

In FIG. 19, terminal 200 converts the virtual interlace numbers in the cluster to the actual interlace numbers by cyclically shifting by 5 PRBs in all the clusters, for example. This makes it possible to allocate the interlaces distributed at both ends of each cluster (e.g., interlaces #5, #6 and interlace #4) to terminal 200 in FIG. 19. Processing is also simplified in FIG. 19 by applying the same rule for converting the virtual interlace numbers to the actual interlace numbers to the plurality of clusters.

Figure 20:
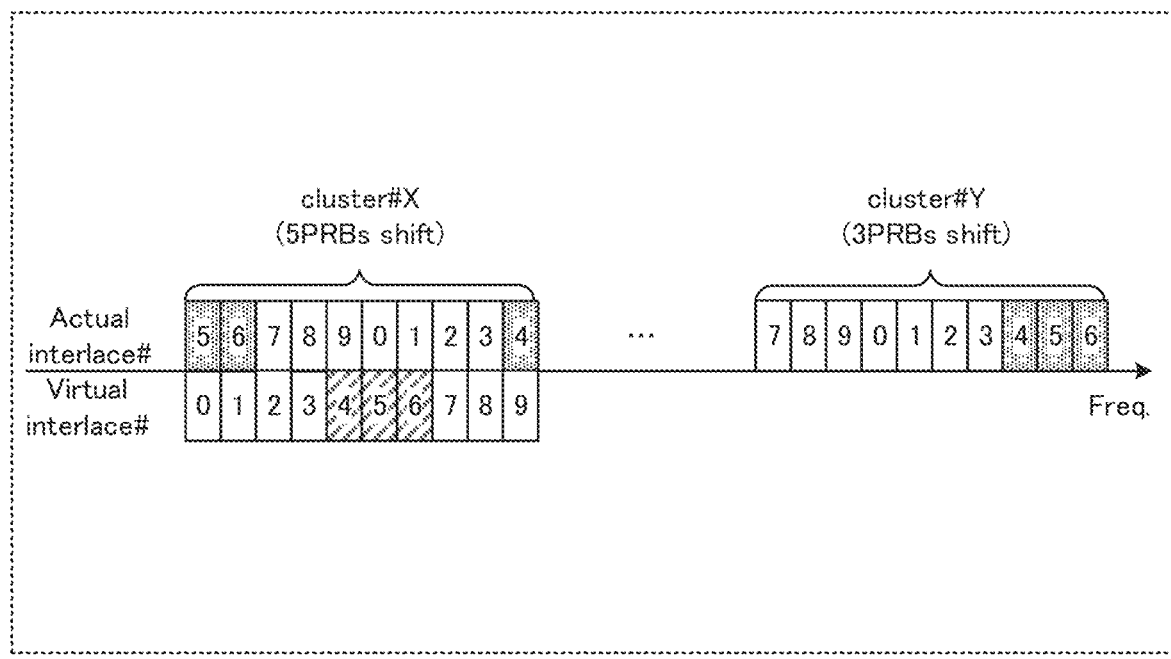
FIG. 20 illustrates other exemplary interlace allocation using the virtual interlace numbers.

Next, in the example illustrated in FIG. 20, virtual interlace numbers #0 to #9 are respectively allocated to the interlaces (i.e., PRBs) in the cluster, as in FIG. 19. In the examples illustrated in FIG. 20, the actual interlace numbers in cluster #X are numbers obtained by cyclically shifting virtual interlace numbers #0 to #9 by 5 PRBs, and the actual interlace numbers in cluster #Y are numbers obtained by cyclically shifting virtual interlace numbers #0 to #9 by 3 PRBs. In other words, the rule for converting the virtual interlace numbers to the actual interlace numbers is different among a plurality of clusters in FIG. 20. In FIG. 20, base station 100 indicates the contiguous interlace allocation pattern of virtual interlace numbers #4 to #6 to terminal 200 by the RIV-based allocation method.

In FIG. 20, terminal 200 converts the virtual interlace numbers to the actual interlace numbers, for example, according to the rule predetermined for each cluster. For example, terminal 200 cyclically shifts the virtual interlace numbers by 5 PRBs in cluster number X in FIG. 20. In addition, terminal 200 cyclically shifts the virtual interlace numbers by 3 PRBs in cluster number Y.

Transmission resources allocated to terminal 200 can be randomized by applying different rules for converting the virtual interlace numbers to the actual interlace numbers to the clusters, as described above. This randomizes interference to another cell and improves a system performance.

In Configuration Example 5, the conversion from the virtual allocation to the actual allocation in terminal 200 enables the non-contiguous interlace allocation in the cluster, as described above, thereby improving the frequency diversity gain.

Further, in Configuration Example 5, the indication of the contiguous virtual interlace allocation pattern by the RIV-based allocation method reduces the signaling overhead.

Note that, although Configuration Example 5 has described the case of converting the virtual interlace numbers to the actual interlace numbers by the cyclic shift, the conversion rule is not limited to this. For example, the contiguous virtual interlace numbers may be indicated in the interlace RA information, and the actual interlace numbers corresponding to the contiguous virtual interlace numbers may be associated with non-contiguous interlaces.

The exemplary configurations of the interlace RA have been described, thus far.

[Exemplary Configuration of Cluster RA]

Next, exemplary configurations of the cluster RA will be described.

<Cluster RA Configuration Example 1>

In Configuration Example 1, the allocation pattern of contiguous virtual cluster groups is indicated as the cluster RA information. In other words, the cluster RA information indicates contiguous virtual cluster group numbers.

For example, base station 100 indicates a contiguous cluster group allocation pattern to terminal 200 using the virtual cluster group numbers. Terminal 200 converts the indicated virtual cluster group numbers to actual cluster group numbers according to a rule predetermined between base station 100 and terminal 200. Terminal 200 assigns signals to the clusters in the cluster groups with the actual cluster group numbers that have been converted.

Figure 21:
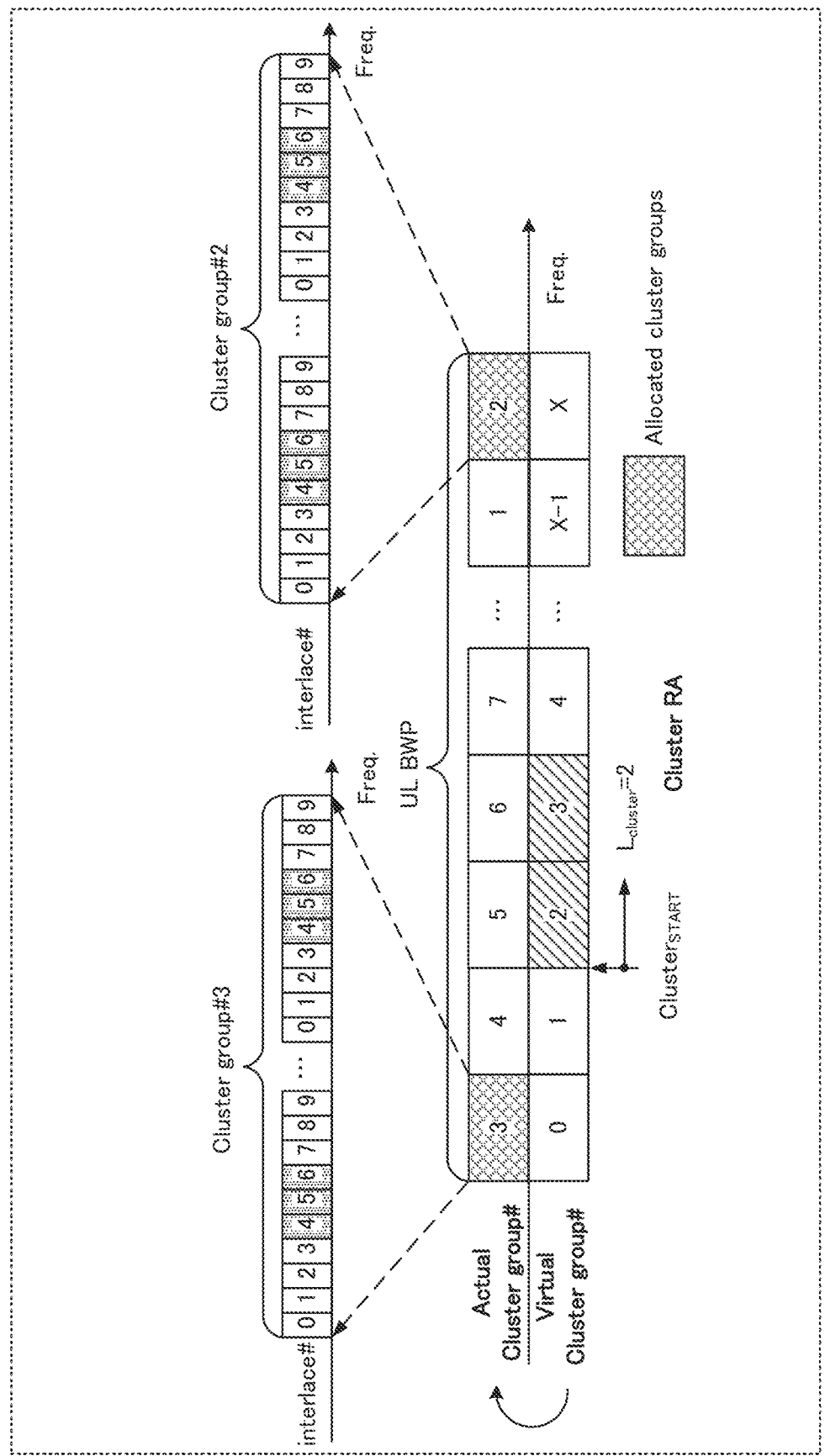
FIG. 21 illustrates exemplary cluster group allocation using virtual cluster group numbers.

For example, in the example illustrated in FIG. 21, virtual interlace numbers #0 to #X are respectively assigned to the cluster groups in the BWP. In the examples illustrated in FIG. 21, the actual cluster group numbers are numbers obtained by cyclically shifting virtual interlace numbers #0 to #X by −3 in the BWP.

In FIG. 21, base station 100 indicates the contiguous cluster group allocation pattern of virtual cluster group numbers #2 and #3 to terminal 200 by the RIV-based allocation method.

In FIG. 21, terminal 200 converts virtual cluster group numbers #2 and #3 to the actual cluster group numbers by cyclically shifting by −3, for example. This makes it possible to allocate the cluster groups distributed at, for example, both ends of the BWP (e.g., actual cluster groups #3 and #2) to terminal 200 in FIG. 21.

As described above, the conversion from the virtual allocation to the actual allocation in terminal 200 enables the non-contiguous allocation in the BWP (or system band), for example, thereby improving the frequency diversity gain.

For example, the OCB specification can be satisfied by the non-contiguous allocation at the both ends of the BWP, as illustrated in FIG. 21, even when the cluster group to be allocated has a narrow bandwidth (when the allocated bandwidth is narrow). In addition, the indication of the contiguous virtual cluster group allocation pattern by the RIV-based allocation method reduces the signaling overhead.

<Cluster RA Configuration Example 2>

Configuration Example 2 focuses on the fact that there is a small difference in the number of signaling bits between the RIV-based allocation method and the bitmap-based allocation method when the number of cluster groups per BWP (or system band) is small.

For example, the bitmap-based allocation method is applied to the cluster RA when the number of cluster groups per BWP is smaller than or equal to a threshold (e.g., 4), and the RIV-based allocation method is applied to the cluster RA when the number of cluster groups per BWP is larger than the threshold, as illustrated in FIG. 22.

In this manner, the signaling overhead can be reduced by applying the RIV-based allocation method when the number of cluster groups per BWP is large. When the number of cluster groups per BWP is small, in contrast, the application of the bitmap-based allocation method enables the allocation including non-contiguous cluster allocation patterns by the bitmap while preventing the increase in the signaling overhead, thereby improving the scheduling gain.

The exemplary configurations of the cluster RA have been described, thus far.

In the present embodiment, terminal 200 assigns a signal to a resource based on frequency resource allocation information indicating allocation of a plurality of cluster groups (e.g., the cluster RA) resulting from grouping a plurality of clusters into which a frequency band (e.g., system band or BWP) is divided, and allocation of interlaces (e.g., the interlace RA) in the clusters, and transmits the signal, as described above. Base station 100 then receives the signal transmitted from terminal 200 based on the cluster RA and the interlace RA for terminal 200.

This allows base station 100 to perform flexible scheduling or frequency-multiplexing in units of cluster groups, for example, for terminals 200 even when terminals 200 have the system bandwidths (or BWPs) different from each other, or when the system bandwidth is 20 MHz or more, for example.

Therefore, it is possible to appropriately transmit/receive signals in the operation in unlicensed bands (e.g., NR-U) according to the present embodiment.

Each embodiment of the present disclosure has been described, thus far.

Other Embodiments

1. Descriptions have been given of the frequency resource allocation methods for uplink, which is transmission from terminal 200 to base station 100, in the above embodiments. However, an embodiment of the present disclosure is applicable to, for example, downlink, which is transmission from base station 100 to terminal 200, and is also applicable to a radio communication link (e.g., sidelink) established in communication between terminals 200 (e.g., vehicle-to-vehicle communication).

Each of the methods described in the above embodiments may be used alone or in combination. In addition, the method to be used may be switched depending on the situation (e.g., communication environment and/or traffic). The communication environment may be represented by at least one of Reference Signal Received Power (RSRP), Received Signal Strength Indicators (RSSIs), Reference Signal Received Quality (RSRQ), and Signal-to-Interference plus Noise power Ratio (SINR), for example.

The uplink data channel (PUSCH) has been described in the above embodiments as an example of a transmission signal for which the frequency resource is allocated. However, the transmission signal is not limited to the PUSCH and may be another signal transmitted from terminal 200 (corresponding to a transmission apparatus) to base station 100 (corresponding to a reception apparatus), for example.

Additionally, the interlaces are not limited to be distributed in units of PRBs on the frequency domain, and may also be distributed in units of subcarrier groups of less subcarriers composing 1 PRB, for example. Further, the interlaces are not limited to be arranged at equal frequency intervals on the resources.

Furthermore, the number of clusters, the number of interlaces in the clusters, the number of cluster groups, the number of clusters in the cluster groups, and the number of subcarriers per interlace (or PRB) in a particular frequency band (e.g., system band) are not limited to those in the examples described in the above embodiments, and may include other values.

Although the operations in unlicensed bands have been described in the above embodiment, the present disclosure is not only for unlicensed bands. It can also be applied to licensed bands, and brings the similar effects.

Other embodiments have been described, thus far.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a radio LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A transmission apparatus according to an embodiment of the present disclosure includes: circuitry, which, in operation, assigns a signal to a resource based on control information indicating allocation of a group among a plurality of the groups resulting from grouping a plurality of blocks into which a frequency band is divided, and allocation of the resource in at least one of the plurality of blocks; and a transmitter, which in operation, transmits the signal.

In an embodiment of the present disclosure, the group includes a bandwidth where carrier sensing is performed.

In an embodiment of the present disclosure, the group is composed of a minimum number of the blocks having a bandwidth equal or greater than a specified minimum bandwidth, and the minimum number of the blocks makes a bandwidth of the group.

In an embodiment of the present disclosure, the allocation of the resource is indicated by first control information, and the first control information includes an allocation starting position of the resource in one of the plurality of blocks and a number of the resources to be consecutively allocated from the allocation starting position.

In an embodiment of the present disclosure, the first control information indicates any of a plurality of patterns of the allocation starting position and the number of the resources, and the plurality of patterns include a pattern for a case where the one of the plurality of blocks is composed of a different number of the resources.

In an embodiment of the present disclosure, the first control information indicates any of a plurality of patterns of the allocation starting position and the number of the resources, and the plurality of patterns include a pattern of no transmission of the signal.

In an embodiment of the present disclosure, the first control information indicates any of a plurality of patterns of the allocation starting position and the number of the resources, and the plurality of patterns include a pattern for a part of the allocated group.

In an embodiment of the present disclosure, the allocation of the resource is indicated by first control information, and the first control information includes an allocation starting position in one of the plurality of blocks and a number of the resources to be consecutively allocated from the allocation starting position, when subcarrier spacing is equal to or smaller than a threshold, and the first control information includes a bitmap indicating whether each resource in the one of the plurality of blocks is allocated, when the subcarrier spacing is larger than the threshold.

In an embodiment of the present disclosure, the control information indicating the allocation of the resource indicates contiguous virtual resource numbers, and the circuitry converts the virtual resource numbers to resource numbers of the resources, and assigns the signal to the resources with the converted resource numbers.

In an embodiment of the present disclosure, the allocation of the group is indicated by second control information, and the second control information includes an allocation starting position in the frequency band and a number of the groups to be consecutively allocated from the allocation starting position.

In an embodiment of the present disclosure, the control information indicating the allocation of the group indicates contiguous virtual group numbers, and the circuitry converts the virtual group numbers to group numbers of the groups, and assigns the signal to the resources in the groups with the converted group numbers.

In an embodiment of the present disclosure, the control information indicating the allocation of the group includes an allocation starting position in the frequency band and a number of the groups to be consecutively allocated from the allocation starting position, when a number of the groups in the frequency band is larger than a threshold, and the control information indicating the allocation of the group includes a bitmap indicating whether the groups in the frequency band are allocated, when the number of the groups is equal to or smaller than the threshold.

A reception apparatus according to an embodiment of the present disclosure includes: circuitry, which, in operation, determines allocation of a group among a plurality of the groups resulting from grouping a plurality of blocks into which a frequency band is divided, and allocation of a resource in at least one of the plurality of blocks; and a receiver, which in operation, receives a signal based on the allocation of the group and the allocation of the resource.

A transmission method according to an embodiment of the present disclosure includes: assigning a signal to a resource based on control information indicating allocation of a group among a plurality of the groups resulting from grouping a plurality of blocks into which a frequency band is divided, and allocation of the resource in at least one of the plurality of blocks; and transmitting the signal.

A reception method according to an embodiment of the present disclosure includes: determining allocation of a group among a plurality of the groups resulting from grouping a plurality of blocks into which a frequency band is divided, and allocation of a resource in at least one of the plurality of blocks; and receiving a signal based on the allocation of the group and the allocation of the resource.

This application is entitled to and claims the benefit of Japanese Patent Application No. 2019-024180 dated Feb. 14, 2019, the disclosure of which including the specification, drawings and abstract is incorporated herein by reference in its entirety.

INDUSTRIAL APPLICABILITY

An exemplary embodiment of the present disclosure is useful for mobile communication systems.

REFERENCE SIGNS LIST

100 Base station
101 Scheduler
102 Holder
103 Modulator
104, 209 Transmitter
105, 201 Antenna
106, 202 Receiver
107 FFT
108 Demapper
109 IDFT
110 Demodulator/decoder
200 Terminal
203 Demodulator
204 Frequency resource allocation calculator
205 Encoder/modulator
206 DFT
207 Mapper
208 IFFT

The invention claimed is:

1. An integrated circuit comprising:
reception circuitry, which, in operation, controls reception of control information including a first resource assignment information; and
transmission circuitry, which, in operation, controls transmission of a signal to a base station on resources determined based on the first resource assignment information,
wherein the first resource assignment information indicates a set of one or more interlace indices, each of which indicating a plurality of resource blocks with a determined interval in a frequency domain,
wherein, for a first subcarrier spacing, the first resource assignment information indicates a starting interlace index and a number of contiguous interlace indices, and wherein, for a second subcarrier spacing larger than the first subcarrier spacing, the first resource assignment information includes a bitmap indicating the set of one or more interlaces.

2. The integrated circuit according to claim 1, wherein the control information includes a second resource assignment information indicating a starting resource block set index and a number of contiguous resource block sets, and
   the resources are determined based on first resource blocks of the set of one or more interlace indices and on second resource blocks determined based on the second resource assignment information.

3. The integrated circuit according to claim 2, wherein each of the contiguous resource block sets is sized 20 MHz.

4. The integrated circuit according to claim 1, wherein a number of bits of the first resource assignment information used for the first subcarrier spacing is larger than that of the second subcarrier spacing.

5. The integrated circuit according to claim 1, wherein the signal is transmitted using the first subcarrier spacing or the second subcarrier spacing.

6. A communication method comprising:
   receiving control information including a first resource assignment information; and
   transmitting, to a base station, a signal on resources determined based on the first resource assignment information,
   wherein, for a first subcarrier spacing, the first resource assignment information includes a starting interlace index and a number of contiguous interlace indicating a set of one or more interlace indices, each of the interlace indices indicating a plurality of resource blocks with a determined interval in a frequency domain, and
   wherein, for a second subcarrier spacing larger than the first subcarrier spacing, the first resource assignment information includes a bitmap indicating the set of one or more interlaces.

7. The communication method according to claim 6, wherein the control information includes a second resource assignment information indicating a starting resource block set index and a number of contiguous resource block sets, and
   the resources are determined based on first resource blocks of the set of one or more interlace indices and on second resource blocks determined based on the second resource assignment information.

8. The communication method according to claim 7, wherein each of the contiguous resource block sets is sized 20 MHz.

9. The communication method according to claim 6, wherein a number of bits of the first resource assignment information used for the first subcarrier spacing is larger than that of the second subcarrier spacing.

10. The communication method according to claim 6, wherein the signal is transmitted using the first subcarrier spacing or the second subcarrier spacing.

11. A communication apparatus comprising:
    a receiver, which in operation, receives control information including a first resource assignment information; and
    circuitry, which in operation, controls a transmission of a signal to a base station on resources determined based on the first resource assignment information,
    wherein, for a first subcarrier spacing, the first resource assignment information includes a starting interlace index and a number of contiguous interlace indicating a set of one or more interlace indices, each of the interlace indices indicating a plurality of resource blocks with a determined interval in a frequency domain, and
    wherein, for a second subcarrier spacing larger than the first subcarrier spacing, the first resource assignment information includes a bitmap indicating the set of one or more interlaces.

12. The communication apparatus according to claim 11, wherein the control information includes a second resource assignment information indicating a starting resource block set index and a number of contiguous resource block sets, and
    the resources are determined based on first resource blocks of the set of one or more interlace indices and on second resource blocks determined based on the second resource assignment information.

13. The communication apparatus according to claim 12, wherein each of the contiguous resource block sets is sized 20 MHz.

14. The communication apparatus according to claim 11, wherein a number of bits of the first resource assignment information used for the first subcarrier spacing is larger than that of the second subcarrier spacing.

15. The communication apparatus according to claim 11, wherein the signal is transmitted using the first subcarrier spacing or the second subcarrier spacing.

* * * * *